United States Patent [19]

Deppe

[11] Patent Number: 4,688,809
[45] Date of Patent: Aug. 25, 1987

[54] GASKET FOR INTERNAL COMBUSTION ENGINE

[75] Inventor: David W. Deppe, Flore, England

[73] Assignee: Cummins Engine Company, Inc., Columbus, Ind.

[21] Appl. No.: 801,747

[22] Filed: Nov. 26, 1985

[51] Int. Cl.$^4$ .......................... F16J 15/08; B65D 53/00
[52] U.S. Cl. ................................ 277/235 B; 277/236; 277/180
[58] Field of Search ............... 277/234, 235 R, 235 A, 277/235 B, 236, 180

[56] References Cited

U.S. PATENT DOCUMENTS

| | | | |
|---|---|---|---|
| 2,157,357 | 5/1939 | Straty | 277/236 |
| 2,307,440 | 1/1943 | Wilson | |
| 3,467,398 | 9/1969 | Bernard | 277/180 |
| 3,656,769 | 4/1972 | Jelinek et al. | 277/236 |
| 3,843,141 | 10/1974 | Kuhn | 277/236 |
| 3,957,275 | 5/1976 | Belter | 277/235 B |
| 4,077,637 | 3/1978 | Hyde et al. | 277/235 A |
| 4,387,904 | 6/1983 | Nicholson | 277/235 B |
| 4,390,185 | 6/1983 | Nicholson | 277/235 B |
| 4,544,169 | 10/1985 | Cobb et al. | 277/235 B |

FOREIGN PATENT DOCUMENTS 684685 12/1952 United Kingdom ............ 277/235 B

Primary Examiner—Robert S. Ward
Attorney, Agent, or Firm—Neuman, Williams, Anderson & Olson

[57] ABSTRACT

A cylinder head gasket for an internal combustion engine which is adapted to compensate for variations in the clamping or hold-down forces which are exerted on the gasket disposed within the joint formed between the cylinder head and the engine block. Because of the spacing of the cylinder head fasteners relative to the ends of the cylinders formed in the block, there are wide areas of the gasket extending between adjacent cylinder ends which are disposed at substantial relative distances from such fasteners. These wide gasket areas are defined at least in part by opposed circumferential segments of the adjacent cylinder ends. Each wide gasket area has a thickness which is substantially greater than the thickness of te remaining portions of the gasket, thereby, resulting in substantially uniform clamping forces being exerted throughout the gasket.

5 Claims, 4 Drawing Figures

GASKET FOR INTERNAL COMBUSTION ENGINE

BACKGROUND OF THE INVENTION

In internal combustion engines, particularly where the engine is of a high compression type (e.g. diesel) sealing problems with the head gasket are oftentimes encountered. One of the principal causes contributing to this problem is the uneven clamping or compressive forces which are exerted on the gasket by the assembled head. It is common in engines of this general type for the head fasteners to be primarily located in the marginal areas of the cylinder head with the result that there are wide areas of the gasket, particularly between adjacent cylinder ends in the engine block, which are disposed at substantial relative distances from the fasteners and thus, the clamping forces exerted on these wide areas by such fasteners are diminished as compared to other areas of the gasket. Because of these non-uniform clamping forces serious sealing problems are encountered due, for example, to excessive gasket wear.

Various attempts at correcting this problem have been tried in the past; however, because of certain inherent design characteristics, they have been beset with one or more of the following shortcomings: (a) special gaskets were utilized which were of costly complex design; (b) special machining of the gasket engaging surfaces of either the cylinder head or engine block or both was required; (c) relocating of the fasteners relative to the cylinder ends was a costly and time-consuming operation; and (d) increasing the number of fasteners and locating them in areas other than the marginal portion, required special tools, fixtures and molds and such additional fasteners frequently created obstructions within the cooling jacket surrounding the cylinders in the engine block.

SUMMARY OF THE INVENTION

Thus, it is an object of the invention to provide a cylinder head gasket which is of simple, inexpensive construction; provides an effective seal without requiring machining modifications being made to either the cylinder head or engine block, and does not require the number and location of the fasteners to be changed.

Further and additional objects will appear from the description, accompanying drawing and appended claims.

In accordance with one embodiment of the invention a gasket is provided for sealing a joint formed between a cylinder head and an engine block. The engine block has a plurality of relatively spaced cylinders formed therein with the corresponding ends thereof terminating at a common surface which is engaged by the gasket. A plurality of fasteners are provided for securing the cylinder head, gasket, and engine block in assembled relation. The fasteners are in spaced relation and engage corresponding marginal portions of the head gasket and block resulting in wide areas of the gasket being formed, which are located between adjacent cylinder ends and are spaced a substantial distance from any of said fasteners. The wide gasket areas are of a substantially greater thickness than the remainder of said gasket resulting in the clamping forces being substantially uniformly distributed throughout the joint-forming surfaces of the mating components.

DESCRIPTION

For a more complete understanding of the invention reference should be made to the drawing wherein.

Figure 1:
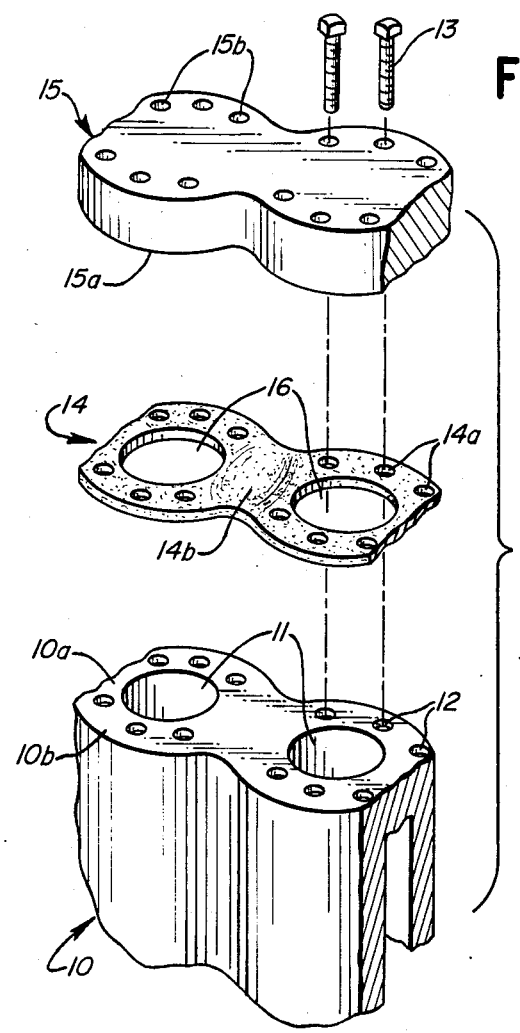
FIG. 1 is a fragmentary, partially schematic, perspective top view of an internal combustion engine showing in exploded relation the cylinder head, improved gasket, engine block and anchor bolts therefore.

Referring now to the drawing and more particularly to FIG. 1, a segment of a conventional internal combustion engine E is shown which includes an engine block 10 having a plurality of cylinders 11 formed therein. The corresponding upper ends of the cylinders terminate at a common planar surface 10a formed in the block. The cylinders are adapted to accommodate suitable drive pistons, not shown, which, in turn, are connected to a crankshaft or the like disposed within the engine block. Besides the cylinders 11, surface 10a is provided with a plurality of internally threaded holes 12 which are arranged in spaced relation and disposed within a marginal portion 10b of the surface. Each hole 12 is adapted to receive the threaded shank of a conventional fastener 13 (e.g. anchor or stud bolt) when the various components of the engine, shown in FIG. 1 and to be hereinafter described, are assembled together in a conventional manner.

Overlying block surface 10a and substantially coincident thereto is the improved cylinder head gasket 14 which is preferably formed from metallic sheet material (e.g. steel plate). The thickness of the sheet material will depend upon the size and type of the engine involved. Gaskets formed of such material are particularly suitable for used in high compression (diesel) engines. One common and serious shortcoming besetting gaskets of this general type has been the inability of the gasket to conform to the flexure of the mating components of the engine. Such flexure is a particular problem where the fastener holes 12 are located only along the margin of the surface 10a resulting in the space from the holes 12 to the perimeter of the cylinder ends to vary substantially and thus, cause the clamping or hold-down force exerted by the fasteners 13 and cylinder head 15 not to be uniformly distributed. When this situation occurs excessive gasket wear will likely result.

Figure 3:
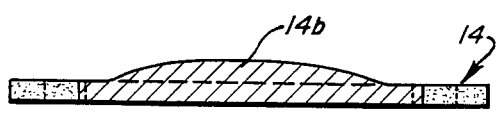
FIG. 3 is an enlarged sectional view taken along line 3—3 of FIG. 2.
Figure 4:
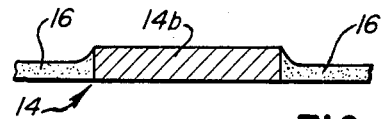
FIG. 4 is similar to FIG. 3 but taken along line 4—4 of FIG. 2.
Figure 2:
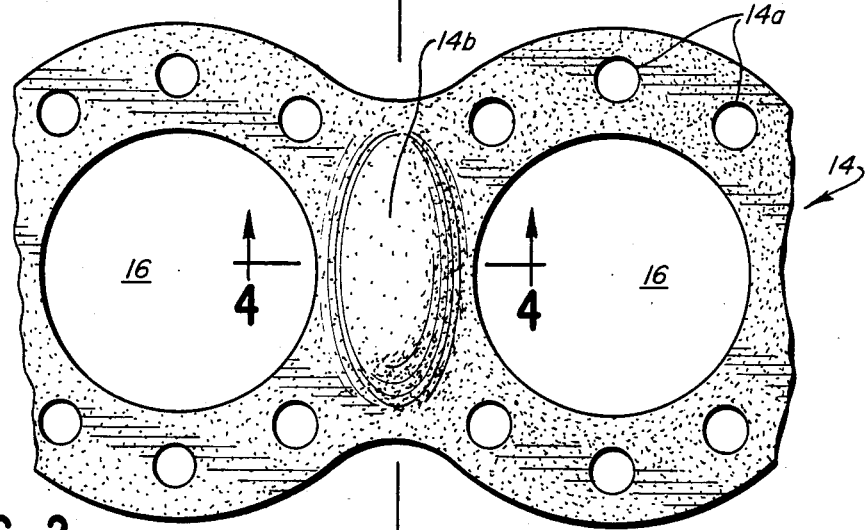
FIG. 2 is an enlarged fragmentary top view of the gasket shown in FIG. 1.

As noted in FIGS. 1 and 2, the improved gasket 14 is provided with cylinder openings 16 aligned with the ends of cylinders 11 and with marginal openings 14a aligned with the internally threaded holes 12. Because of the relative location of the openings 14a and 16, substantially wide areas 14b of the gasket located generally between adjacent openings 16, and partially defined thereby are formed which are disposed a substantial distance from a fastener opening 14a. If a conventional gasket of uniform thickness throughout was to be utilized in such a situation, the clamping or hold down forces in such areas would be diminished and by reason of the close proximity of such areas to the ends of the cylinders 11, serious flexure of the mating components in these areas would occur when high temperatures and pressures were generated within the cylinders. The improved gasket 14, however, readily overcomes this problem by increasing the thickness of the gasket in these areas, see FIGS. 3 and 4. Because the gasket 14 is normally of metallic construction, the increased thickness of the gasket in the selected areas can be accomplished by flame spraying such areas with additional metallic material which will fuse to the gasket base material. The amount of additional material applied may vary and will depend upon the amount of clamping or hold-down force required to attain a substantially uniform distribution of such force throughout the mating components.

The cylinder head 15 is of conventional design and is provided with a planar surface 15a which is adapted to forcibly engage a surface of the gasket. A plurality of holes 15b are formed in the marginal portions of the head for accommodating the shanks of the fastener 13.

Thus, an improved gasket has been provided which is of simple, sturdy and inexpensive construction and effectively solves a sealing problem by effecting substantially uniform distribution of the clamping or hold-down forces throughout the mating components and between which the gasket is disposed. No modification of the gasket engaging surface of either the cylinder head or the engine block is required in order to accommodate the improved gasket and effect the desired seal.

I claim:

1. A gasket for sealing a joint between adjacent surfaces of a cylinder head and an engine block of an internal combustion engine wherein the adjacent surfaces have a substantially like peripheral configuration and the block surface is provided with a plurality of relatively spaced cylinder openings disposed inwardly from a marginal portion of the block surface and a plurality of relatively spaced fastener means disposed within the marginal portion and at varying distances from the cylinder openings, each area of the block surface intermediate adjacent cylinder openings being relatively wide and void of fastener means, the fastener means being adapted to effect compression of the gasket between the adjacent surfaces; said gasket being adapted to overlie the block surface and conform substantially to the configuration thereof, the areas of said gasket corresponding to the block surface wide areas intermediate adjacent cylinder openings having a greater thickness throughout than the remainder of said gasket thereby effecting substantially uniform distribution of the forces throughout the cylinder head surface when the gasket is compressed between the adjacent surfaces.

2. The gasket of claim 1 wherein the gasket is of a metallic base material and the additional thickness of said wide areas include additional metallic material fused to said base material.

3. The gasket of claim 2 wherein the gasket base material is a steel plate and the fusion of the additional material at the wide areas is effected by flame spraying a surface portion of the plate defining each wide area.

4. A gasket for sealing a joint between joint-forming surfaces of a cylinder head and an engine block of an internal combustion engine, the engine block joint-forming surface being provided with a plurality of relatively spaced cylinder openings spaced inwardly from a marginal portion of the joint-forming surface, the marginal portion being provided with a plurality of relatively spaced means for accommodating fasteners for securing the head in superimposed relation with respect to the block joint-forming surface, the arrangement of the fastener-accommodating means relative to each cylinder opening being such that only certain circumferential segments of each cylinder opening are adjacent the fastener-accommodating means and at least a portion of the remaining circumferential segments partially define wide fastener-free areas spaced a substantial relative distance from the fastener-accommodating means and substantially spanning the distance between adjacent cylinder openings; said gasket being interposed the joint-forming surfaces and compressed thereby and conforming substantially to the block joint-forming surface, said gasket having wide areas corresponding to the fastener-free wide areas of the block joint-forming surface, each gasket wide area throughout having a thickness greater than the thickness of segments of a corresponding gasket marginal portion disposed intermediate adjacent block surface fastener-accommodating means thereby effecting substantially uniform distribution of gasket compression forces throughout the cylinder head joint-forming surface.

5. The gasket of claim 4 wherein a first opening is provided in said gasket for each cylinder opening of the block joint-forming surface and conforms substantially to the configuration thereof, and a second opening is provided in said gasket for each fastener accommodating means of the block joint-forming surface, a segment of each wide gasket area substantially aligned with a line interconnecting center axes of adjacent cylinder openings having the greatest gasket thickness.

* * * * *